US007096723B2

(12) United States Patent
Kienzle et al.

(10) Patent No.: US 7,096,723 B2
(45) Date of Patent: Aug. 29, 2006

(54) METHOD AND DEVICE FOR DETERMINING THE THROUGHPUT OF A FLOWING MEDIUM

(75) Inventors: Wolfgang Kienzle, Hemmingen (DE); Hans Hecht, Korntahl-Muenchingen (DE); Manfred Strohrmann, Karlsruhe (DE); Wolfgang-Michael Mueller, Rutesheim (DE); Axel-Werner Haag, Stuttgart (DE); Uwe Konzelmann, Asperg (DE); Dieter Tank, deceased, late of Kornwestheim (DE); by Anke Fleischer, legal representative, Kornwestheim (DE); Josef Kleinhans, deceased, late of Vaihingen (DE); by Marie-Luise Beck, legal representative, Eisingen (DE); by Hildegard Nelson, legal representative, Eugene, OR (US); by Guido Kleinhans, legal representative, Bad Brueckenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,519

(22) PCT Filed: Dec. 7, 2001

(86) PCT No.: PCT/DE01/04624

§ 371 (c)(1),
(2), (4) Date: Jan. 6, 2003

(87) PCT Pub. No.: WO02/50412

PCT Pub. Date: Jun. 27, 2002

(65) Prior Publication Data

US 2003/0177843 A1 Sep. 25, 2003

(30) Foreign Application Priority Data

Dec. 21, 2000 (DE) ................................ 100 63 752

(51) Int. Cl.
*G01M 15/00* (2006.01)

(52) U.S. Cl. ...................................................... 73/118.2

(58) Field of Classification Search .................. 73/116, 73/117.2, 117.3, 118.1, 118.2, 861, 198, 195, 73/196

See application file for complete search history.

(56) References Cited

U.S. PATENT DOCUMENTS

| | | | | |
|---|---|---|---|---|
| 4,043,196 | A | 8/1977 | Trageser | |
| 4,903,665 | A * | 2/1990 | Washino et al. ............ | 123/435 |

(Continued)

FOREIGN PATENT DOCUMENTS

| | | |
|---|---|---|
| DE | 39 25 377 | 2/1991 |
| DE | 197 40 916 A | 10/1998 |
| EP | 0 584 856 A | 3/1994 |

OTHER PUBLICATIONS

Mayer F et al: "Scaling of Thermal CMOS Gas Flow . . . ", Micro Electro Mechanical Systems, 1996, MEMS' 96, Proceedings, an Investigation of Micro Structures, Sensors, Actuators, Machines, and Systems. IEEE, The Ninth Annual International Workshop on San Diego, CA, USA Feb. 11-15, 1996, New York, USA, IEEE, Feb. 11, 1996 pp. 116-121.

*Primary Examiner*—Eric S. McCall
(74) *Attorney, Agent, or Firm*—Michael J. Striker

(57) ABSTRACT

Methods and/or devices for detecting the flow rate of a flowing medium, in particular the flow rate of a flowing air mass, are described, in which the flowing medium is detected with two evaluation methods that operate according to different principles and the two measurement signals obtained are set in relation to each other in order to determine correction methods. Since the two measurement methods react differently to interference effects, the comparison of the two output signals permits conclusions to be drawn as to the type and the order of magnitude of the interference effects and a corrected measurement signal can be obtained, which is independent of the interference effects.

12 Claims, 1 Drawing Sheet

U.S. PATENT DOCUMENTS

| | | | | | |
|---|---|---|---|---|---|
| 4,905,649 | A | * | 3/1990 | Washino et al. | 123/435 |
| 5,140,850 | A | * | 8/1992 | Ellmann et al. | 73/118.2 |
| 5,435,180 | A | * | 7/1995 | Uchiyama et al. | 73/204.19 |
| 5,832,403 | A | * | 11/1998 | Kowatari et al. | 701/103 |
| 6,109,249 | A | * | 8/2000 | Wild et al. | 123/568.21 |
| 6,370,935 | B1 | * | 4/2002 | He et al. | 73/1.34 |
| 6,556,929 | B1 | * | 4/2003 | Kleinhans et al. | 702/45 |
| 6,571,613 | B1 | * | 6/2003 | Schenk et al. | 73/118.2 |

* cited by examiner

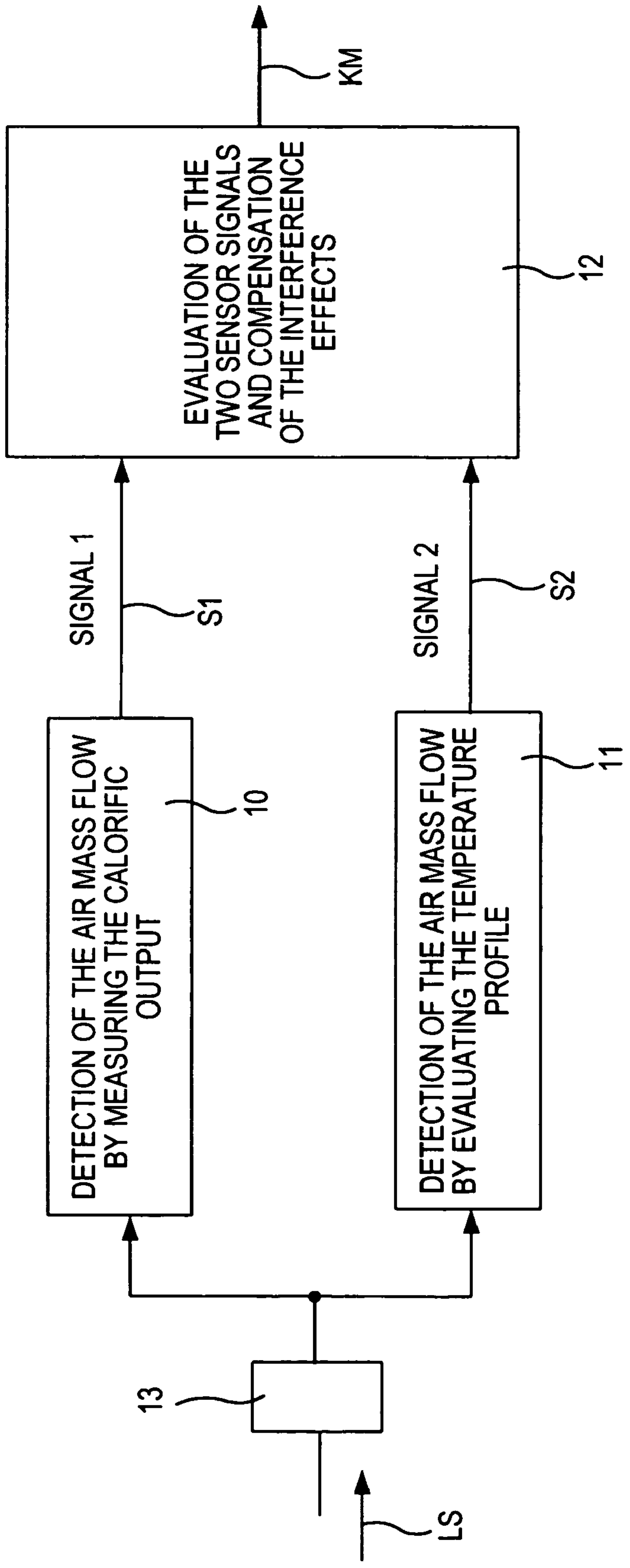
KM
EVALUATION OF THE TWO SENSOR SIGNALS AND COMPENSATION OF THE INTERFERENCE EFFECTS
12
SIGNAL 1
S1
SIGNAL 2
S2
DETECTION OF THE AIR MASS FLOW BY MEASURING THE CALORIFIC OUTPUT
10
DETECTION OF THE AIR MASS FLOW BY EVALUATING THE TEMPERATURE PROFILE
11
13
LS

METHOD AND DEVICE FOR DETERMINING THE THROUGHPUT OF A FLOWING MEDIUM

BACKGROUND OF THE INVENTION

The invention relates to a method and device for detecting the flow rate of a flowing medium, in particular for detecting the air flow prevailing in the intake tube of an internal combustion engine and therefore determining the aspirated air mass.

In order to detect the air mass aspirated by an internal combustion engine, usually a hot film air mass measuring device is used. These devices have a heatable element, which is exposed to the air flow to be measured and is cooled by it. There are a variety of possibilities for embodying the hot film air mass measuring device, both for the heating regulation and the evaluation method. Both types of air mass measuring devices and an existing method for detecting the air mass flow with a hot film air mass measuring device are based on the measurement of the heat imparted to the air mass flow that is flowing past it. Air mass measuring devices of one type measure the electrical energy required for regulating the hot film to a constant temperature. A second method and an associated second sensor device are also based on the fact that the hot film is regulated to a constant temperature. However, the measurement signal used here is not the required calorific output, but the temperature profile at the edge of the hot film that is embodied as a membrane. With the aid of a temperature sensor disposed upstream of the heating region and a temperature sensor disposed downstream of it, the temperature difference between these two points is determined. Both of the temperature sensors, which are embodied as temperature-dependent resistances, are components of a bridge circuit. A measurement signal is obtained from the bridge voltage produced and represents the temperature difference between the temperature-dependent resistance upstream of the heating region and the temperature-dependent resistance downstream of the heating region.

Both types of sensors and evaluation methods can be impaired by interference effects, for example airborne moisture or dirt. This can cause a sensor of this kind to produce a false reading or can lead to an error in signal evaluation.

SUMMARY OF THE INVENTION

The object of the invention is to minimize the above-mentioned error sources and the false readings that result from them. This object is attained with the method of detecting a flow rate of an air mass flowing in an intake tube of an internal combustion engine, which comprises the steps of detecting an air mass flow according to two different evaluation methods; combining two different measurement results with each other to determine correction values; using in the both evaluation methods output signals of a flow rate measuring element; and reacting by the both methods differently to interference effects so that a comparison of two signals permits conclusion to be drawn as to a type and/or an order of magnitude of interference effects occurring, This object is also attained with a device for detecting a flow rate of an air mass flowing in an intake tube of an internal combustion engine, comprising means for detecting an air mass flow according to two different evaluation methods; means for combining two different measurement results with each other to determine correction values; a flow measurement element whose output signals are used in both evaluation methods which eact differently to interference effects; and means for comparing two signals to permit conclusion to be drawn as to a type and/or an order of magnitude of interference effects occurring.

The method according to the invention and/or the device according to the invention for detecting the flow rate of a flowing medium, in particular the flow rate of the air mass aspirated by an internal combustion engine, has the advantage that interference effects during the measurement can be compensated. This occurs in an advantageous fashion by virtue of the fact that a redundant measurement is executed, which operates according to two different methods that are executed by a single sensor or two different sensors are provided for measuring the air mass; the essential thing is that the two methods selected or the two sensors react differently to interference effects. The interference effects, which occur to a more powerful degree in one method or the associated sensor than with the other method or the other sensor, can then be compensated for by combining the two measurement results. These advantages are achieved by means of a method and/or a device with the features of claim 1.

BRIEF DESCRIPTION OF THE DRAWINGS

The single FIGURE of the drawings is a view schematically illustrating a method of and device for detecting a flow rate of a flow rate medium in accordance with the present invention.

DESCRIPTION OF THE PREFERRED EMBODIMENT

When detecting the flow rate of a flowing medium, there is the danger that precision will be impaired by interference effects. In particular in connection with the detection of an air mass flowing in the intake tube of an internal combustion engine, a number of problems arise, for example, due to the fact that the moisture in the flowing air is not known to a precise enough degree or that the sensor elements become contaminated through continuous use, as a result of which errors can occur in the evaluation. Another problem in the measurement of the air flowing in the intake tube of an internal combustion engine is caused by the fact that the flow does not always occur in one direction, but a so-called flow reversal or a pulsation can occur. In order to compensate for errors and in particular to compensate for interference effects that are caused by such intake tube pulsations, it is known to execute the detection of the flowing air mass according to two different methods and to combine the obtained measurement results with each other in order to thereby minimize erroneous measurements.

That is why DE-OS 39 25 377, for example, proposes a method for measurement error correction in which the backflow-induced measurement error of a hot film air mass measuring device is compensated. To that end, as a first value, the air mass is detected with the hot film air mass measuring device and as a second value, the air mass is calculated according to a method that operates independently of this device in that the throttle valve angle and the speed of the engine are evaluated. The choice as to which value is used for actually determining the air mass depends on the operating range in which the engine is operating. Since the two values have different certainties in different operating ranges of the engine, a correction signal can be obtained by comparing the two measurement values and this correction signal is taken into account in order to increase measurement precision.

In this known method, however, only the measurement error caused by backflow is compensated; other measurement errors are not taken into account. In addition, the known method uses only one air mass sensor. The second set of data required for calculating the air mass is not measured directly, but calculated; these data cannot be used for the correction or compensation according to the invention of general, varied measurement errors.

The method according to the invention and the associated device that is shown in the FIGURE allow a variety of measurement errors to be compensated and consequently a very reliable and precise detection of the flow rate of a flowing medium, for example the air mass aspirated by an internal combustion engine, can be obtained. To that end, in the exemplary embodiment that is shown in the form of a block diagram in FIG. 1, the air mass flow LS to be measured is determined according to two different methods that both work with the same sensor 13, which includes a heatable hot film. The sensor 13 is designed to be suitable for both measurement methods and is exposed to the flowing air mass flow LS, which cools it.

The evaluation method executed in block 10 represents a first type of evaluation method and is based on the measurement of the heat imparted to the air mass flow that is flowing past the sensor. The heat imparted to the air mass flow that is flowing past is detected by measuring the electrical energy that is required to regulate the hot film to a constant temperature. Thus in the end, the calorific output is measured and the air mass flow is determined based on it.

The second type of detection of the air mass flow or the second evaluation method occurs in block 12 and is executed by evaluating the temperature profile. In this connection, the hot film of the sensor 13 is likewise regulated to a constant temperature. However, instead of using the required calorific output as a measurement signal, the temperature profile at the edge of the membrane of the hot film air mass measuring device is determined. Therefore in addition to the hot film and the heating resistance, the air mass measuring device must also have at least two temperature-dependent resistances. In a hot film air mass measuring device of this kind, for example, an evaluation is made of the temperature difference between a temperature sensitive resistance disposed upstream of the heating region and a temperature-dependent resistance disposed downstream of heating region, which both serve as a temperature sensors.

The two output signals S1 and S2 emitted by the blocks 10 and 11 are supplied to a shared evaluation device 12. This evaluation device 12 evaluates the two signals S1 and S2 that are obtained according to different methods and a compensation of interference effects is thereby carried out. The output signal of the evaluation device 12 is then sent as a corrected measurement signal KM to an additional processing. This additional processing can, for example, take place in the control unit of an internal combustion engine, which, based on the measurement signal that indicates the air mass actually flowing at that time in the intake tube of an internal combustion engine, calculates the triggering signals required for the regulation of the engine.

The device shown in the FIGURE represents a hot film air mass measuring device in which a sensor is provided, which can be operated in two different methods or in which the air mass is determined according to two different methods. A device of this kind makes it possible to detect the air mass flow in a redundant fashion by measuring the calorific output and by evaluating the temperature profile. Since the two measuring methods react differently to interference effects, the comparison of the two sensor signals permits conclusions to be drawn as to the type and the order of magnitude of the associated interference effects; the interference effects determined in this manner can be taken into account in the additional signal evaluation and can therefore be compensated.

Instead of a single sensor, two different sensors can also be used, which are known as HFM 2 and HFM 5; a first sensor is a hot film air mass measuring device 2 in which the air mass is detected by measuring the calorific output and a second sensor is a hot film air mass measuring device 5 in which the air mass flow is detected by evaluating the temperature profile of the sensor membrane. Therefore once again, evaluation methods of a first and second type are carried out and the measurement results are combined with each other, but in this case, for two sensors or sensor elements.

The invention has been explained in the context of detecting a flowing air mass, but it can in principle be used wherever a flowing medium influences a heatable measuring element.

The invention claimed is:

1. A method of detecting a flow rate of an air mass flowing in an intake tube of an internal combustion engine, the method comprising the steps of detecting an air mass flow according to two different evaluation methods; combining two different measurement results with each other to determine correction values; using in the both evaluation methods output signals of a flow rate measuring element; and reacting by the both methods differently to interference effects so that a comparison of two signals permits conclusion to be drawn as to a type and/or an order of magnitude of interference effects occurring.

2. A method as defined in claim 1; and further comprising using as a sensor a hot film air mass measuring device or using as both sensors hotfilm air mass measuring devices; and for both evaluation methods regulating a hot film to a constant temperature.

3. A method as defined in claim 1; and further comprising measuring a required calorific output in a first one of the evaluation methods.

4. A method as defined in claim 1; and further comprising detecting a temperature profile in a second one of the evaluation methods.

5. A method as defined in claim 1; and further comprising making an evaluation of a temperature difference between a temperature sensor disposed upstream of a heating region in a direction of a flowing medium and a temperature sensor disposed downstream of the heating region.

6. A method as defined in claim 1; and further comprising using two temperature sensors which are temperature-dependent resistances and disposed in a bridge circuit, and evaluating as a measuring signal a bridge voltage produced as a result of a prevailing temperature difference.

7. A device for detecting a flow rate of an air mass flowing in an intake tube of an internal combustion engine, comprising means for detecting an air mass flow according to two different evaluation methods; means for combining two different measurement results with each other to determine correction values; a flow measurement element whose output signals are used in both evaluation methods which react differently to interference effects; and means for comparing two signals to permit conclusion to be drawn as to a type and/or an order of magnitude of interference effects occurring.

8. A device as defined in claim 7; and further comprising sensing means selected from the group consisting of a sensor used as a hot film air mass measuring device or and both sensors used as hot film air mass measuring devices; and means for regulating a hot film to a constant temperature for both evaluation methods.

9. A device as defined in claim 7; and further comprising means for measuring a required calorific output in a first one of the evaluation methods.

10. A device as defined in claim 7; and further comprising means for detecting a temperature profile in a second one of the evaluation methods.

11. A device as defined in claim 7; and further comprising means for making an evaluation of a temperature difference between a temperature sensor disposed upstream of a heating region in a direction of a flowing medium and a temperature sensor disposed downstream of the heating region.

12. A device as defined in claim 7; and further comprising two temperature sensors which are temperature-dependent resistances and are disposed in a bridge circuit, and means for evaluating as a measuring signal a bridge voltage produced as a result of a prevailing temperature difference.

* * * * *